United States Patent [19]

Schulze et al.

[11] Patent Number: 5,118,751
[45] Date of Patent: Jun. 2, 1992

[54] REDISPERSIBLE POWDER COMPOSITION

[75] Inventors: Joachim Schulze; Hardy Herold; Juergen Hinterwinkler, all of Burghausen, Fed. Rep. of Germany

[73] Assignee: Wacker Chemie GmbH, Munich, Fed. Rep. of Germany

[21] Appl. No.: 748,849

[22] Filed: Aug. 23, 1991

[30] Foreign Application Priority Data

Sep. 27, 1990 [DE] Fed. Rep. of Germany ....... 4030638

[51] Int. Cl.⁵ .............................................. C08L 29/04
[52] U.S. Cl. ........................................ 524/503; 524/5; 524/269; 524/425; 524/427; 525/57
[58] Field of Search ............... 524/503, 427, 425, 269; 525/57

[56] References Cited

U.S. PATENT DOCUMENTS 4,820,754 4/1989 Negri et al. ........................ 524/427

Primary Examiner—Paul R. Michl
Assistant Examiner—LaVonda R. DeWitt
Attorney, Agent, or Firm—Burgess, Ryan & Wayne

[57] ABSTRACT

The invention relates to a redispersible powder composition comprising a) a base polymer from the group comprising vinyl ester polymers, styrene polymers, acrylate polymers and vinyl chloride polymers,
b) 2 to 15% by weight, relative to the base polymer, of polyvinyl alcohol having a degree of hydrolysis of 85 to 94 mol % and a Höppler viscosity of 2 to 25 mPa·s,
c) 3 to 30% by weight, relative to the total weight of polymer components, of a fine antiblocking agent,
d) 0.1 to 2% by weight, relative to the base polymer, of antifoams, which contains
e) 1 to 8% by weight, relative to the base polymer, of a fully hydrolyzed 1-alkylvinyl ester/vinyl ester copolymer having a Höppler viscosity of 1 to 5 mPa·s. The redispersible composition according to the invention is suitable in particular for use in flowing, hydraulically setting leveling compounds. Further areas of application for the redispersible powder composition according to the invention are its use in building adhesives, mortars, as an additive to gypsum, and in plasters and emulsion paints.

14 Claims, No Drawings

REDISPERSIBLE POWDER COMPOSITION

BACKGROUND OF THE INVENTION

1) Field of the Invention

The invention relates to a redispersible powder composition containing fully hydrolyzed 1-alkylvinyl ester/vinyl ester copolymers and to its use in construction materials, in particular in flowing floor-leveling compounds.

2) Description of the Related Art

Redispersible powders have been used for many years especially in the construction sector as plastic modifiers of hydraulically setting systems. A review of the effect of redispersible powders is given in the journal TIZ (formerly: Tonindustrie-Zeitung) 9, p. 698 (1985). The properties of adhesion, abrasion resistance, scratch resistance and tensile bending strength of hydraulically setting compounds are especially improved by adding redispersible powders. Redispersible powders of this type are described, for example, in EP-A 228,657 or DE-A 2,049,114 and are prepared by spray-drying aqueous polymer dispersions with the addition of polyvinyl alcohol and other additives. The readily flowable powder thus obtained, which has particle sizes between 10 and 250 μm, is redispersed in water to give a dispersion having particle sizes between 0.1 and 5 μm. This dispersion should remain stable over a relatively long period of time, i.e. it should not have a tendency to settle.

An important area of application of redispersible powders is hydraulically setting, flowing floor-leveling compounds. Floor-leveling compounds of this type are known from DE-A 3,028,559 and EP-A 116,524 and in general comprise cement or mixtures of various cements, carefully matched filler combinations, redispersible powders, plasticizing agents, and, if desired, other additives. These compounds are delivered to the construction site in the form of premixed plaster, are combined simply by stirring with water and are applied to the floor. The materials spread to form a smooth surface, which serves either directly as the wear layer or as a base for further coatings. This application always leads to problems. Especially when relatively thick layers are applied, uneven patches, such as craters or pinholes, are formed on the surface. The surface is not as smooth as desired by the customer and has to be reworked.

Accordingly, the object of the present invention was to overcome the disadvantages just described of previously known floor-leveling compounds with respect to the surface condition of coatings manufactured therewith, without losing the advantages produced by the addition of redispersible powders, such as improved abrasion resistance, scratch resistance and adhesion.

Surprisingly, this object could be achieved by adding a fully hydrolyzed 1-alkylvinyl ester/vinyl ester copolymer to the redispersible powder composition.

Polyvinyl alcohols containing alkylvinyl alcohol units of this type have previously only been known as extrudable thermoplastics (JP-A 52/57,256, CA 88:75032n; JP-A 52/60,842, CA 87:118700c), in a mixture with glycerol as melt adhesive composition for bonding paper (JP-A 54/76,634; CA 91:176392x), as cobinder for paper coating compositions (DE-A 3,622,820), as rheological additives for aqueous dispersions (DE-A 3,724,331) and as sizing agents for yarns (DE-A 3,724,332).

SUMMARY OF THE INVENTION

The invention relates to a redispersible powder composition comprising
a) a base polymer from the group comprising vinyl ester polymers, styrene polymers, acrylate polymers and vinyl chloride polymers,
b) 2 to 15% by weight, relative to the base polymer, of polyvinyl alcohol having a degree of hydrolysis of 85 to 94 mol % and a Höppler viscosity of 2 to 25 mPa·s,
c) 3 to 30% by weight, relative to the total weight of polymer components, of a fine antiblocking agent,
d) 0.1 to 2% by weight, relative to the base polymer, of antifoams, which contains
e) 1 to 8% by weight, relative to the base polymer, of a fully hydrolyzed 1-alkylvinyl ester/vinyl ester copolymer having a Höppler viscosity of 1 to 5 mPa·s.

DESCRIPTION OF THE PREFERRED EMBODIMENTS

Vinyl ester polymers which are suitable as base polymers are vinyl acetate homopolymers; copolymers of vinyl acetate with ethylene, vinyl chloride and/or other vinyl esters, such as vinyl laurate or Versatic vinyl esters VeoVa 9 or VeoVa 10 (vinyl esters of saturated α-branched monocarboxylic acids having 9 or 10 C atoms from Shell); homopolymers of vinyl esters of saturated $C_3$-$C_8$-alkyl carboxylic acids or copolymers thereof with ethylene, vinyl chloride and/or further vinyl esters. Examples of styrene polymers are copolymers of styrene with acrylic esters, such as styrene/butyl acrylate polymers. Suitable vinyl chloride polymers are vinyl chloride/ethylene copolymers.

Vinyl acetate homopolymers, vinyl acetate/ethylene copolymers having an ethylene content of 1 to 30% by weight, vinyl acetate or vinyl laurate copolymers having 1 to 25% by weight of ethylene and 50 to 75% by weight of vinyl chloride are preferably used.

For Component b) the use of polyvinyl alochols are preferred which have a degree of hydrolysis of 85 to 94 mol % and a Höppler viscosity, determined as a 4% strength solution, of 2 to 13 mPa·s.

The proportion of antiblocking agent c) is preferably 4 to 20% by weight. Antiblocking agents having average particle sizes of 0.1 to 50 μm are particularly preferred. Examples of antiblocking agents are finely ground aluminum silicates, kieselguhr, colloidal silica gel, pyrogenic silica, micro silica, light spar, kaolin, talc, cements, diatomaceous earth, calcium carbonate or hydrous magnesium silicate.

Suitable antifoams are the commercially available products which have proven suitable for use in hydraulically setting systems. Examples are silicone antifoams, antifoams based on liquid hydrocarbons, fatty acid esters or polyalkylene glycols. The antifoam content is preferably 0.2 to 1.5% by weight, relative to the base polymer.

The fully hydrolyzed 1-alkylvinyl ester/vinyl ester copolymer preferably contains 65 to 95% by weight of vinyl alcohol units and 5 to 35% by weight of 1-alkylvinyl alcohol units having $C_1$ to $C_4$-alkyl groups. 1-Methylvinyl alcohol units are particularly preferred. These copolymers are prepared by copolymerization of vinyl acetate with isopropenyl acetate, followed by hydrolysis. The preparation is described in DE-A 3,724,332. The redispersible powder composition preferably contains 1 to 5% by weight of the copolymer containing polyhydroxyl groups, the Höppler viscosity, measured as a 4% strength aqueous solution, being particularly preferably 1.5 to 4.0 mPa·s.

If desired, the redispersible powder composition can contain additional additives. Thus, 0 to 30% by weight, relative to the base polymer, of cement-plasticizing agents can be added. Preferably, sulfonate-containing condensation products of melamine or ketone with formaldehyde and/or naphthalene sulfonic acid/formaldehyde condensation products are used for this purpose. An example of such a cement-plasticizing agent is, for example, Melment F10 from SKW Trostberg.

If desired, it is also possible to add surface-active substances, such as emulsifiers or wetting agents, preferably in an amount of 0 to 1.0% by weight, relative to the base polymer. Examples of these are anionic surfactants and non-ionic surfactants, for example alkyl polyglycols and ethylene oxide/propylene oxide copolymers.

To prepare the redispersible powder composition, the base polymer is used as an aqueous dispersion. The polyvinyl alcohol component b) is added to this dispersion. The polyvinyl alcohol is preferably used for this purpose as an aqueous solution, it being possible to control the viscosity of the dispersion via the amount of water used. The fully hydrolyzed 1-alkylvinyl ester/vinyl ester copolymer is preferably added to the dispersion of the base polymer and the polyvinyl alcohol component b) in aqueous solution. These mixing processes can proceed in any desired order. Incorporation of the antifoam is not critical; it can be mixed with the components just mentioned before drying or even be mixed with the dry redispersible powder composition as a pulverulent product. Any surface-active substances used and the cement-plasticizing agents are preferably added to the mixture present as a dispersion before drying.

After the components have been mixed, the dispersion is dried, preferably spray-dried or freeze-dried. Spray-dried is particularly preferred. Known devices, such as, for example, spraying through multi-component nozzles or using a disk, in a dry gas stream which, if desired may be heated, can be used for this purpose. In general, temperatures above 250° C. are not employed. The optimum temperature of the dry gas can be determined in a few tests; temperatures above 60° C. have often proved particularly suitable.

In order to increase the shelf life and, for example, to prevent, in the case of powders having a relatively low glass transition temperature $T_g$, baking and blocking antiblocking agent c) is added to the powder obtained. This is preferably carried out as long as the powder is still finely divided, for example while it is still suspended in the dry gas. In particular, the antiblocking agent is metered into the drying device spatially separated from but simultaneously with the dispersion.

The redispersible powder composition according to the invention is suitable in particular for use in hydraulically setting leveling compounds. The composition of hydraulically setting leveling compounds of this type is known per se. The basis of these compounds is the hydraulic binder and fillers, preferably in a weight ratio of 1:5 to 1:1. Examples of hydraulic binders are Portland cement, high-alumina cement or anhydrite or mixture thereof. The filler used is preferably quartz sand, in particular in a particle size of 0.1 to 1.0 mm, or calcium carbonate or mixtures thereof.

Customary additives in compounds of this type include cement-plasticizing agents.

Relative to the dry weight of the hydraulically setting leveling compound, the amount to be added of the redispersible powder composition according to the invention is preferably between 0.5 and 10% by weight.

Before application, the leveling compound modified with the redispersible powder composition is preferably stirred with 10 to 30% by weight of water, relative to the dry weight of the leveling compound/redispersible powder mixture. This amount of water depends on the composition of the leveling compound.

The redispersible powder composition according to the invention is particularly suitable for use in flowing, hydraulically setting leveling compounds. Apart from improving the abrasion resistance, scratch resistance and adhesion, its use leads to the formation of very smooth surfaces without craters or pin holes. Further areas of application for the redispersible powder composition according to the invention are its use in building adhesives, mortars, as an additive for gypsum, and in plasters and day emulsion paints.

The examples which follow serve to further illustrate the invention:

SUBSTANCES USED IN THE EXAMPLES

Dispersion LL1

Aqueous dispersion stabilized with polyvinyl alcohol, having a solids content of 55%, and being based on a vinyl acetate/ethylene copolymer having a vinyl acetate content of 90% by weight and an ethylene content of 10% by weight from Wacker-Chemie GmbH.

Dispersion LL2

Aqueous dispersion stabilized with polyvinyl alcohol, having a solids content of 50%, and being based on an ethylene/vinyl chloride/vinyl laurate terpolymer having an ethylene content of 17% by weight, a vinyl chloride content of 70% by weight and a vinyl laurate content of 13% by weight from Wacker-Chemie GmbH.

Polyviol M 05/140

Polyvinyl alcohol having a Höppler viscosity of 5.0 mPa·s, as a 4% strength aqueous solution, and a saponification number of 140 (=degree of hydrolysis 88 mol %) from Wacker-Chemie GmbH.

Polyviol M 13/140

Polyvinyl alcohol having a Höppler viscosity of 13.0 mPa·s, as a 4% strength aqueous solution, and a saponification number of 140 (=degree of hydrolysis 88 mol %) from Wacker-Chemie GmbH.

Polyviol G 04/140

Polyvinyl alcohol having a Höppler viscosity of 4.0 mPa.s, as a 4% strength aqueous solution, and a saponification number of 140 (=degree of hydrolysis 88 mol %) from Wacker-Chemie GmbH.

PME

Fully hydrolyzed isopropenyl acetate/vinyl acetate copolymer having a Höppler viscosity of 2.5 mPa·s, as a 4% strength aqueous solution, and an isopropenyl acetate content of 20 mol % from Wacker-Chemie GmbH.

Melment F 10

Cement-plasticizing agent based on a melamine/formaldehyde condensation product containing sulfonate groups from SKW Trostberg.

Wacker S 670

Silicone-based antifoam from Wacker-Chemie GmbH.

Agitan 305

Antifoam based on liquid hydrocarbons from Münzig Heilbronn. Genapol PF 20

Nonionic emulsifier based on an ethylene oxide/propylene oxide copolymer from Hoechst AG.

EXAMPLE 1

4000 parts by weight of dispersion LL1, 1100 parts by weight of polyviol M 05/140 as a 20% strength solution in water (10% by weight, relative to LL1 resin), 132 parts by weight of PME as a 50% strength solution in water, (3% by weight, relative to LL1 resin), 13.2 parts by weight of Wacker S 670 (0.6% by weight, relative to LL1 resin) and 500 parts by weight of water were thoroughly mixed. The mixture was sprayed through a two-component nozzle. The nozzle component used was air precompressed to 4 bar; the droplets formed were dried in a countercurrent with air heated to 125° C. 10% by weight, relative to the total weight of polymer components, of a commercially available antiblocking agent (mixture of calcium-magnesium carbonate and hydrous magnesium silicate) were added to the powder obtained.

EXAMPLE 2

4000 parts by weight of dispersion LL1, 880 parts by weight of polyviol G 04/140 as a 20% strength solution in water (8% by weight, relative to LL1 resin), 220 parts by weight of PME as a 50% strength solution in water, (5% by weight, relative to LL1 resin), 17.2 parts by weight of Wacker S 670 (0.8% by weight, relative to LL1 resin), 1100 parts by weight of Melment F10 as a 40% strength aqueous solution (20% by weight, relative to LL1 resin) and 100 parts by weight of water were thoroughly mixed. The mixture was sprayed through a two-component nozzle. The nozzle component used was air precompressed to 4 bar; the droplets formed were dried in a countercurrent with air heated to 125° C. 10% by weight, relative to the total weight of polymer components, of a commercially available antiblocking agent (mixture of calcium-magnesium carbonate and hydrous magnesium silicate) were added to the powder obtained.

EXAMPLE 3

4000 parts by weight of dispersion LL2, 1800 parts by weight of polyviol M 13/140 as a 10% strength solution in water (9% by weight, relative to LL2 resin), 80 parts by weight of PME as a 50% strength solution in water, (2% by weight, relative to LL2 resin), 20 parts by weight of Agitan 305 (1% by weight, relative to LL2 resin), 4 parts by weight of Genapol PF20 (0.2% by weight, relative to LL2 resin) and 500 parts by weight of water were thoroughly mixed. The mixture was sprayed through a two-component nozzle. The nozzle component used was air precompressed to 4 bar; the droplets formed were dried in a countercurrent with air heated to 125° C. 10% by weight, relative to the total weight of polymer components, of a commercially available antiblocking agent (mixture of calcium-magnesium carbonate and hydrous magnesium silicate) were added to the powder obtained.

COMPARATIVE EXAMPLE A

The redispersible powder was prepared according to Example 1, except that no PME was added.

COMPARATIVE EXAMPLE B

The redispersible powder was prepared according to Example 2, except that no PME was added.

TECHNOLOGICAL TEST

The redispersible powder compositions according to the Examples were tested in leveling compounds of the following recipe:

60.0 parts by weight of Portland cement 35F
15.0 parts by weight of EFA filler (electrostatic filter ash filler from VNDK Dortmund)
153.0 parts by weight of quartz sand H33 (Quarzwerke Frechen)
30.0 parts by weight of Millicarb (calcium carbonate filler from Omya Cologne)
39.0 parts by weight of Carborex 20 (calcium carbonate filler from Omya Cologne)
1.5 parts by weight of Melment F10 (cement-plasticizing agent from Trostberg)
1.5 parts by weight of Tamol NN9401 (cement-plasticizing agent from BASF)

As a comparative experiment without adding redispersible powder, 300 parts by weight of the leveling compound were thoroughly mixed with 51 parts by weight of water and then cast onto a sheet at a film thickness of 4 mm.

When the redispersible powders according to the invention were added, 290 parts by weight of the leveling compound were mixed with 10 parts by weight of the redispersible powder. The composition was then thoroughly mixed with 51 parts by weight of water and cast onto a sheet at a film thickness of 4 mm.

TEST FOR SURFACE CONDITION

The surface was rated visually using the following rating scale:
1—very smooth, without craters and pin holes
2—very smooth, without craters, a few pin holes
3—smooth, few craters, many pin holes
4—smooth, some craters, many pin holes

TEST FOR HARDNESS AND SCRATCH RESISTANCE

The hardness and scratch resistance of the leveling compound was tested by scratching with a knife. At the same time, this test gives information about the abrasion resistance of the leveling compound.

Rating scale:
1—very hard, very solid composite, highly scratch resistant
2—hard, solid composite, scratch resistant
3—moderately hard, moderate composite, moderately scratch resistant
4—moderately hard, poor composite, not very scratch resistant The results of the technological test are summarized in Table 1.

TABLE 1

| Powder composition | Surface condition | Hardness/ scratch resistance |
| --- | --- | --- |
| Example 1 | 1 | 1 |
| Example 2* | 2 | 2 |
| Example 3 | 1 | 2 |
| Comp. Example A | 3 | 1 |
| Comp. Example B* | 4 | 2 |
| without powder | 3 | 4 |

*Melment F10 and Tamol NN9401 were omitted in the leveling compound recipe, since cement-plasticizing agents are already used in the powder recipe.

We claim:

1. A redispersible powder composition comprising
   a) a base polymer selected from the group consisting of vinyl ester polymers, styrene polymers, acrylate polymers and vinyl chloride polymers,
   b) 2 to 15% by weight, relative to the base polymer, of polyvinyl alcohol having a degree of hydrolysis of 85 to 94 mol % and a Höppler viscosity of 2 to 25 mPa·s,
   c) 3 to 30% by weight, relative to the total weight of polymer components, of a fine antiblocking agent,
   d) 0.1 to 2% by weight, relative to the base polymer, of antifoams, and
   e) 1 to 8% by weight, relative to the base polymer, of a fully hydrolyzed 1-alkylvinyl ester/vinyl ester copolymer having a Höppler viscosity of 1 to 5 mPa·s.

2. A redispersible powder compositon as claimed in claim 1, wherein the fully hydrolyzed 1-alkylvinyl ester/vinyl ester copolymer contains 65 to 95% by weight of vinyl alcohol units and 5 to 35% by weight of 1-alkylvinyl alcohol units having $C_1$ to $C_4$-alkyl groups.

3. A redispersible powder composition as claimed in claim 1, which contains a fully hydrolyzed isopropenyl acetate/vinyl acetate copolymer.

4. A redispersible powder composition as claimed in claim 1, wherein the base polymer a) present is a vinyl acetate homopolymer, vinyl acetate/ethylene copolymer having an ethylene content of 1 to 30% by weight, or vinyl acetate or vinyl laurate copolymers having 1 to 25% by weight of ethylene and 50 to 75% by weight of vinyl chloride.

5. A redispersible powder composition as claimed in claim 1, wherein up to 30% by weight, relative to the base polymer, of cement-plasticizing agents are added to said composition.

6. A redispersible powder composition as claimed in claim 1, wherein up to 1.0% by weight, relative to the base polymer, of emulsifiers or wetting agents is added to said composition.

7. A flowing, hydraulyic setting, leveling compound containing a redispersible powder composition as claimed in claim 1.

8. The compound of claim 7 wherein the redispersible powder composition is present in an amount from about 0.5 to about 10% by weight relative to the dry weight of said compound.

9. A building adhesive composition containing a redispersible powder composition as claimed in claim 1.

10. A mortar composition containing a redispersible powder composition as claimed in claim 1.

11. A gypsum composition containing a redispersible powder composition as claimed in claim 1.

12. A plaster composition containing a redispersible powder composition as claimed in claim 1.

13. An emulsion paint composition containing a redispersible powder composition as claimed in claim 1.

14. A method for improving the surface properties of hydraulically setting, flowing floor leveling compounds which comprises admixing with said compounds the redispersible powder composition of claim 1.

* * * * *